US008935624B2

(12) United States Patent
Russak et al.

(10) Patent No.: US 8,935,624 B2
(45) Date of Patent: Jan. 13, 2015

(54) METHOD FOR COPYING IMAGES (75) Inventors: Zeev Russak, RaAnana (IL); Zeev Glozman, Tel-Aviv (IL)

(73) Assignee: Voyant Health Ltd., Petach-Tikva (IL)

( * ) Notice: Subject to any disclaimer, the term of this patent is extended or adjusted under 35 U.S.C. 154(b) by 0 days.

(21) Appl. No.: 11/640,311

(22) Filed: Dec. 18, 2006

(65) Prior Publication Data
US 2008/0148167 A1 Jun. 19, 2008

(51) Int. Cl.
*G06F 3/048* (2013.01)
*G06F 3/00* (2006.01)
*G06F 9/54* (2006.01)

(52) U.S. Cl.
CPC ...................................... *G06F 9/543* (2013.01)
USPC ............ 715/769; 715/764; 715/810; 715/850

(58) Field of Classification Search
USPC .................................. 715/769, 764, 748, 810
See application file for complete search history.

(56) References Cited

U.S. PATENT DOCUMENTS

| | | | | | |
|---|---|---|---|---|---|
| 4,975,690 | A | * | 12/1990 | Torres ............................ | 715/856 |
| 5,276,795 | A | * | 1/1994 | Hoeber et al. .................. | 715/813 |
| 5,425,141 | A | * | 6/1995 | Gedye ............................ | 715/797 |
| 5,469,540 | A | * | 11/1995 | Powers et al. .................. | 715/203 |
| 5,602,996 | A | * | 2/1997 | Powers et al. .................. | 715/807 |
| 5,764,229 | A | * | 6/1998 | Bennett .......................... | 715/797 |
| 6,005,575 | A | * | 12/1999 | Colleran et al. ............... | 715/807 |
| 6,269,389 | B1 | | 7/2001 | Ashe | |
| 6,573,915 | B1 | * | 6/2003 | Sivan et al. .................... | 715/781 |
| 6,986,105 | B2 | * | 1/2006 | Walker, Jr. ..................... | 715/222 |
| 7,310,781 | B2 | * | 12/2007 | Chen et al. ..................... | 715/769 |
| 7,509,345 | B2 | * | 3/2009 | DeSpain et al. ............ | 707/104.1 |
| 7,689,926 | B2 | * | 3/2010 | de Souza et al. ............... | 715/781 |
| 7,921,372 | B2 | * | 4/2011 | Sauve et al. .................... | 715/767 |
| 2003/0007007 | A1 | * | 1/2003 | Hinegardner et al. ........ | 345/769 |
| 2006/0041589 | A1 | * | 2/2006 | Helfman et al. ............ | 707/104.1 |
| 2008/0212861 | A1 | * | 9/2008 | Durgan et al. ................. | 382/131 |
| 2010/0309212 | A1 | * | 12/2010 | Muir .............................. | 345/545 |

OTHER PUBLICATIONS

TechSmith, SnagIt Screen Dumps, Nov. 21, 2003, version 7.0.2, pp. 1-10.*
Microsoft.com, Microsoft Screen Shots, Dec. 2007, pp. 1-2.*

* cited by examiner

*Primary Examiner* — Amy Ng
*Assistant Examiner* — Erik Stitt (57) ABSTRACT

An apparatus for copying image data between computer applications running under at least one operating system, the apparatus comprising: a selector, operable by a user, for selecting an object from a computer application, and an image data importer, associated with the selector, and configured to automatically import image data of the selected object into a predetermined target computer application, upon the selecting.

15 Claims, 8 Drawing Sheets

METHOD FOR COPYING IMAGES

FIELD AND BACKGROUND OF THE INVENTION

The present invention relates to computer user interfaces and, more particularly, but not exclusively to a system and apparatus for copying images between computer applications.

In human-computer interaction, cut and paste or copy and paste is a user interface paradigm for transferring text, data, files or objects from a source to a destination. Most ubiquitous is the ability to cut and paste sections of plain text.

The term "cut and paste" derives from the traditional practice in manuscript editing in which paragraphs were literally cut from a page with scissors and physically pasted onto another page.

This traditional practice was standard practice as late as the 1980s. Editing scissors with blades long enough to cut an 8½"-wide page were available at stationery stores. The advent of photocopiers made the practice easier and more flexible.

The cut-and-paste paradigm was widely popularized by Apple™ in the Lisa™ and Macintosh™ operating systems and applications. It was mapped to a key combination consisting of a special control key held down while typing the letters X (for cut), C (for copy), and V (for paste).

The above key combinations were later adopted by Microsoft in Windows™. Common User Access (in Windows™ and OS/2™) also uses combinations of the Insert, Del, Shift and Control keys.

Some environments allow cutting and pasting with a computer mouse (by drag and drop, for example).

The first multiple clipboard utility Copy-Paste appeared on the Macintosh in 1989 and extended the keyboard concept for each clipboard so that holding down the command key+c+ any number (0-9) would copy to a separate clipboard. Copy-Paste later displayed and allowed editing hundreds of clipboards and added a clipboard recorder or stack of the most recently made cuts or copies.

Copy-and-paste refers to the popular, simple method of reproducing data from a source application to a destination application, which is only different from cut and paste in that the original source data is not deleted or removed as it is with the latter process.

Copying can be performed on most graphical user interface systems using the key combinations such as Ctrl+C or Ctrl+Ins, or by using some other method, such as a context menu or a toolbar button.

Once data have been copied into the area of memory referred to as the clipboard, they can be pasted into a destination using the key combinations Ctrl+V or Shift+Insert, or methods dependent on the system.

Macintosh computers use the key combinations Command+C and Command+V. In the X Window System, selecting text copies it to a clipboard, while middle-clicking pastes.

The popularity of this method stems from its simplicity and the ease with which data can be moved between various applications without resorting to permanent storage.

By now, the cut-and-paste paradigm (or copy-and-paste) is a universal paradigm, used on a daily basis by most computer users.

Currently, there are many computer applications, which implement the cut-and-paste (or copy-and-paste) paradigm, as described in further detail hereinabove.

For example, TechSmith Inc. offers the Snag-It™ product. The Snag-It™ product allows a computer user to capture screen images of objects or entire screens, and copy the images from one computer document to another.

However with current products, the copy-and-paste operation is a multi step semiautomatic process. The user has to select the image in an application, as well as a target application that the image data is copied to.

Furthermore, the image data is temporarily stored in a file (or a clipboard), before the image is copied to the target application, and the access to the file (or a clipboard) has to be appropriately managed.

On most systems there is only one location in the clipboard, hence another cut operation overwrites the previously stored information. Multiple clipboard entries are provided by many UNIX text editors and some Windows™ clipboard manager programs that are available over the Internet.

With current systems, only when the user selects the target application, for the specific copy-and-paste operation, is the image data copied to the target application.

For example, U.S. Pat. No. 6,269,389, to Ashe, filed on May 5, 1995, entitled "Method and system for controlling the copying and insertion of contents of documents", describes a clipboard manager. The clipboard manager employs preemptive scheduling for access to contents of a clipboard region of memory in a computer.

There is thus a widely recognized need for, and it would be highly advantageous to have, a system devoid of the above limitations.

SUMMARY OF THE INVENTION

According to one aspect of the present invention, there is provided an apparatus for copying image data between computer applications running under at least one operating system, the apparatus comprising: a) a selector, operable by a user, for selecting an object from a computer application; and b) an image data importer, associated with the selector, and configured to automatically import image data of the selected object into a predetermined target computer application, upon the selecting.

According to a second aspect of the present invention, there is provided a method for copying image data between computer a applications running under at least one operating system, the method comprising: allowing a user to select an object from a computer application; and upon the selecting, automatically importing image data of the selected object into a predetermined target computer application.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof.

Moreover, according to actual instrumentation and equipment of preferred embodiments of the method and system of the present invention, several selected steps could be implemented by hardware or by software on any operating system of any firmware or a combination thereof.

For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings.

With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. The description taken with the drawings making apparent to those skilled in the art how the several forms of the invention may be embodied in practice.

In the drawings.

DESCRIPTION OF THE PREFERRED EMBODIMENTS

The present embodiments comprise a method and apparatus for importing image data from one computer application to a target computer application.

A computer application is a defined subclass of computer software that employs the capabilities of a computer directly to a task that the user wishes to perform. This should be contrasted with operating systems which are involved in integrating a computer's various capabilities, but typically does not directly apply them in the performance of tasks that benefit the user. An application generally runs within or under an operating system.

Typical computer applications, used on a daily basis, include a word processor (such as Word™), a spreadsheet editor (such as Excel™), etc.

There are also computer applications used in specific industries.

For example, in medical imaging, Picture Archiving and Communication Systems (PACS) are computer applications dedicated to storage, retrieval, distribution and presentation of medical images.

With a method according to a preferred embodiment of the present invention, a user may select an object appearing in a window of a computer application (say, a PACS application), and the image data of the selected object is automatically imported to a predefined target computer application.

The predefined target computer application may be predefined by an administrator of a system, predefined by the user, or simply be an application the method is implemented by (say, a medical image calibration software installed with a functionality for implementing the method, as described in further detail hereinbelow).

That is to say, according to a preferred embodiment of the present invention, the user merely has to choose the object, for having the image data of the object automatically imported to the target application.

Unlike current methods, the user does not have to engage in a multi-step process, where the user selects an object (say, by performing a Copy or Cut operation), the image data of the object as held by the operating system is temporarily placed in a file (or in a clipboard), the user chooses the target application, and the image is pasted on the target application's window.

For example, a user uses propriety PACS software, to examine a radiographic image of a human organ, or bone. The user also uses a computer application for calibrating the radiographic image.

In accordance with a preferred embodiment of the present invention, the user chooses the radiographic image in the PACS software. Consequently, the image data of the radiographic image is automatically imported from the operating system to the target computer application used for calibrating the image.

The radiographic image may be presented, edited, and calibrated by the targeted computer application used for calibrating the image.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings.

The invention is capable of other embodiments or of being practiced or carried out in various ways. Also, it is to be understood that the phraseology and terminology employed herein is for the purpose of description and should not be regarded as limiting.

Figure 1:
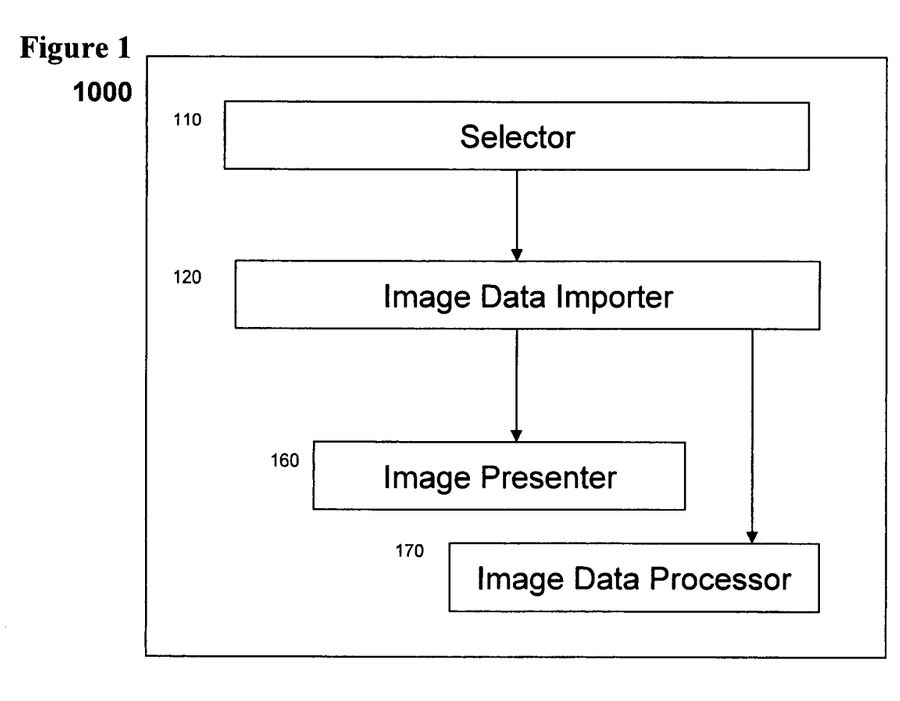
FIG. 1 is a block diagram illustrating an apparatus for copying image data between computer applications, according to a preferred embodiment of the present invention.

Reference is now made to FIG. 1, which is a block diagram illustrating an apparatus for copying image data between computer applications, according to a preferred embodiment of the present invention.

Apparatus 1000 includes a selector 110.

The selector 110 may be used by a user, to select an object in a computer application, say a radiographic image in a Picture Archiving and Communication Systems (PACS).

Preferably, the selector 110 presents a marker to the user, and allows the user to drag the marker onto an image of the object, thereby to select the object, as described in further detail hereinbelow.

The apparatus further includes an image data importer 120, connected to the selector 110.

An operating system, such as Windows™ has access to image data of each object presented to a user in a computer screen by the operating system.

The image data importer 120 automatically imports image data of the selected object from the operating system into a predetermined target computer application, upon the selection of the object by the user.

That is to say, once the user selects the object from the PACS, or other computer application, the image data of the selected object is imported from the operating system to a target application, as described in further detail hereinbelow.

Preferably, the target application is an application preinstalled with an apparatus 1000, such as a word processor, spreadsheet software, software for calibrating medical digital images, etc.

Optionally, the target application is a target application chosen by an administrator of the apparatus 1000, or a target application chosen by the user. Once the user or administrator selects the target application, image data of any object selected by the user is automatically imported from the operating system to the selected target application.

Preferably, the image data importer 120 finds if the selected object belongs to the target application, and thereby avoids importing the image data of an object belonging to the target application.

Optionally, apparatus 1000 also includes an image capturer, connected to the selector 110.

The image capturer captures the image data of the object selected by the user, from an operating system prior to the importing of the image data of the object to the target application.

For example, the image capturer may be implemented using a window spy. A window spy is software that is used for capturing the handle of the window where the image of the object is displayed, and the handle is used to import the graphic object data from the operating system, as described in further detail hereinbelow. An example of a window spy is Windows™ Spy.

One problem with the Windows™ operating system is that the Windows™ operating system does not provide for capturing of image data from a window which is not topmost of the windows presented to the user, as explained in further detail hereinbelow.

That is to say, when a user of a target application selects an object while using the target application, the window of the target application is topmost. However, the Windows™ operating system does not provide for capturing image data of the selected object's window, as the object's window is not topmost among windows managed by the operating system.

In order to allow the capturing the image data of the object selected by the user, the selected object's window is made topmost.

Preferably, apparatus 1000 further includes a topmost maker, connected with the selector.

The topmost maker makes the selected object topmost. Consequently, the image data of the selected object may be captured from the operating system. For example, the image capturer may capture the image data from the Windows™ operating system, as described in further detail hereinbelow.

The target application may be used to present the image data, process the image data, edit the image data, etc, as known in the art.

Optionally, apparatus 1000 includes an image presenter 160, connected to the image data importer 120.

The image presenter 160 presents an image of the selected object in a window of the target application, using the imported image data.

Preferably, the image presenter presents an image of the selected object in a window of the target application, using the imported image data, according to a policy predefined by a user or an administrator of the apparatus 1000.

For example, an administrator of the apparatus 1000 may define a policy that all images are to be aligned with the upper border of a window, presented in a certain position in the window, presented in a certain size, etc.

Preferably, the apparatus also comprises an image data processor 170, connected to the image data importer 120.

The image data processor 170 may process the image data, according to a predefined policy. The policy may be defined by a user, an administrator of the apparatus 1000, etc.

An example of such a policy would be that the image data processor 170 may process the color images to a grey scale, improve the quality of the image, etc, as known in the art.

Figure 2:
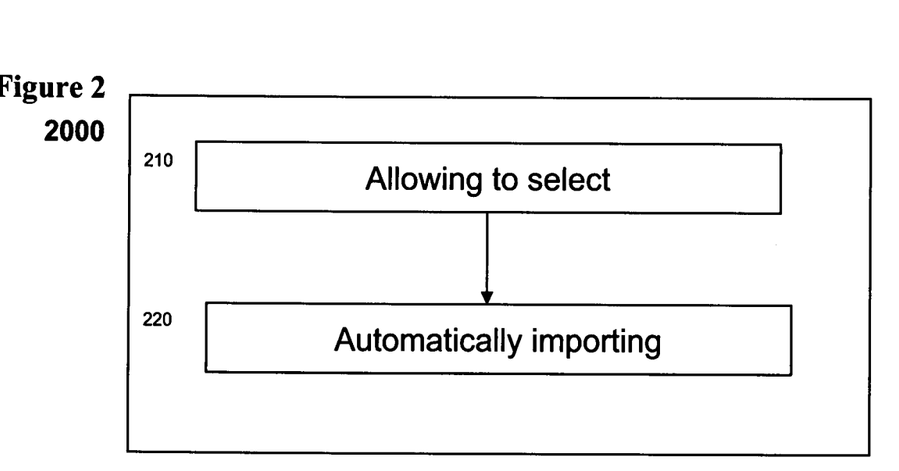
FIG. 2 is a flowchart illustrating a first method for copying image data between computer applications, according to a preferred embodiment of the present invention.

Reference is now made to FIG. 2, which is a flowchart illustrating a method for copying image data between computer applications, according to a preferred embodiment of the present invention.

According to method 2000, a user is allowed 210 to select an object from a computer application, say using a selector 110, as described in further detail hereinabove.

For example, a user may select a radiographic image in a Picture Archiving and Communication Systems (PACS).

Figure 3:
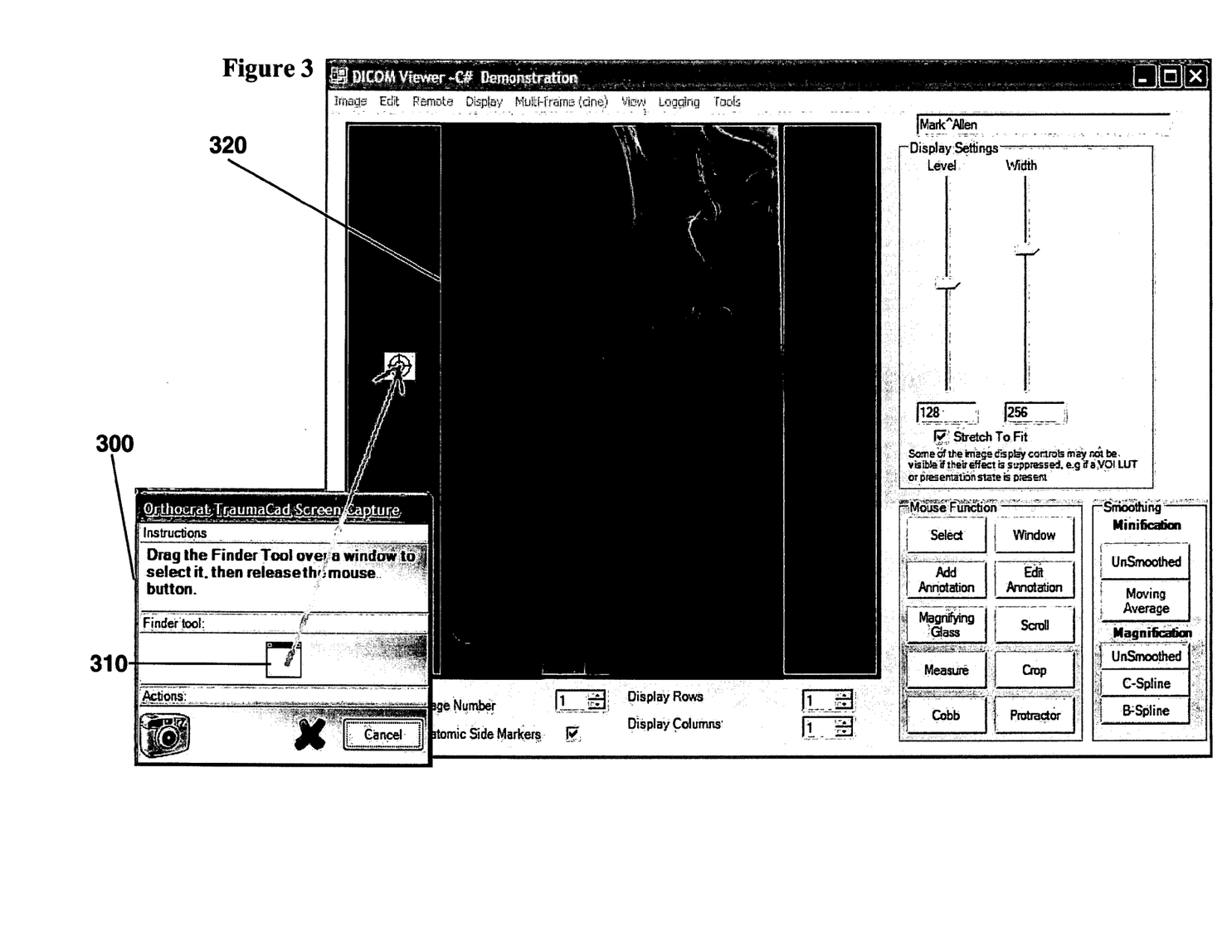
FIG. 3 shows an exemplary marker, for selecting an object, according to a preferred embodiment of the present invention.

Reference is now made to FIG. 3, which shows an exemplary marker, for selecting an object, according to a preferred embodiment of the present invention.

Preferably, the user is presented a marker 310, and allowed to drag the marker 310 onto an image of the object 320, thereby to select the object 320.

Upon the selection 310 of the object by the user (say by dragging the marker 310 into the image of the object, as described hereinabove) the image data of the selected object is automatically imported 320 from the operating system into a predetermined target computer application.

That is to say, once the user selects 310 the object from the PACS, or other computer application, the image data of the selected object is imported 320 into a target application, say using an image data importer 120, as described in further detail hereinbelow.

Preferably, the method 2000 is implemented by an application preinstalled within an apparatus 1000, such as a word processor, spreadsheet software, software for calibrating medical digital images, etc.

Optionally, the target application is a target application chosen by an administrator of the apparatus 1000, or a target application chosen by the user in advance.

Once the user or administrator selects the target application, image data of any object selected by the user is automatically imported to the selected target application.

Preferably, there is verified that the object, selected by the user, does not belong to the target application itself, say using the image data importer 120. If the selected object belongs to the target application, the image data of the object, which belongs to the target application, is not imported to the target application.

Optionally, the image data of the object is retrieved from the operating system prior to the importing of the image data of the object to the target application, say using the image capturer described hereinabove.

One problem with the Windows™ operating system is that the Windows™ operating system does not allow capturing of image data from a window which is not topmost of the windows presented to the user.

For example, when a user of a target application selects an object while using the target application, the window of the target application is topmost. However, the Windows™ operating system does not provide for capturing image data of the selected object's window, as the object's window is not topmost among windows managed by the operating system.

In order to allow the capturing the image data of the object selected by the user, the selected object's window is made topmost.

In order to overcome the problem with the Windows™ operating system, the selected object is made topmost, say using the methods described in further detail hereinbelow. Consequently, the image data of an object may be captured from the Window™ operating system.

The target application may be used to present the image data, process the image data, edit the image data, etc, as known in the art.

Preferably, the image data is used to present the image in a window already used by the target application, in a new window, etc.

Preferably, the image of the selected object is presented in the window of the target application, using the imported image data, according to a policy predefined by a user or an administrator of the apparatus 1000, as described in further detail hereinabove.

Figure 4:
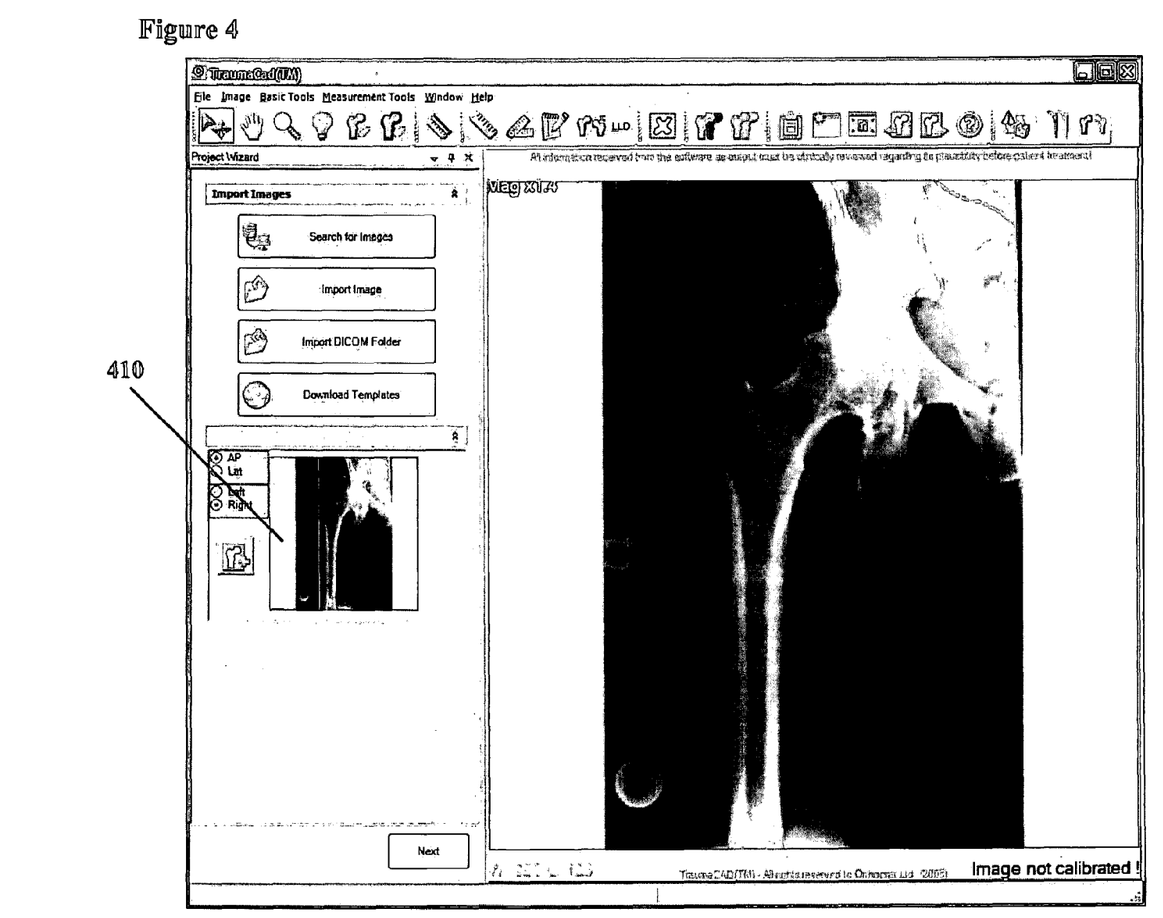
FIG. 4 shows an exemplary image of the object selected in FIG. 3, after import to a target application, according to a preferred embodiment of the present invention.

Reference is now made to FIG. 4, which shows an exemplary image of the object selected in FIG. 3, after import to a target application, according to a preferred embodiment of the present invention.

An administrator of the apparatus 1000 may define a policy that all images are to be aligned with the upper border of a window, presented in a certain position 410 in the window, presented in a certain size, etc.

Preferably, the image data imported to the target application is processed, according to a predefined policy. The policy may be defined by a user, an administrator of the apparatus 1000, etc.

For example, the image data processor may present color images in grey scale, improve the quality of the image, etc, as known in the art.

Figure 5:
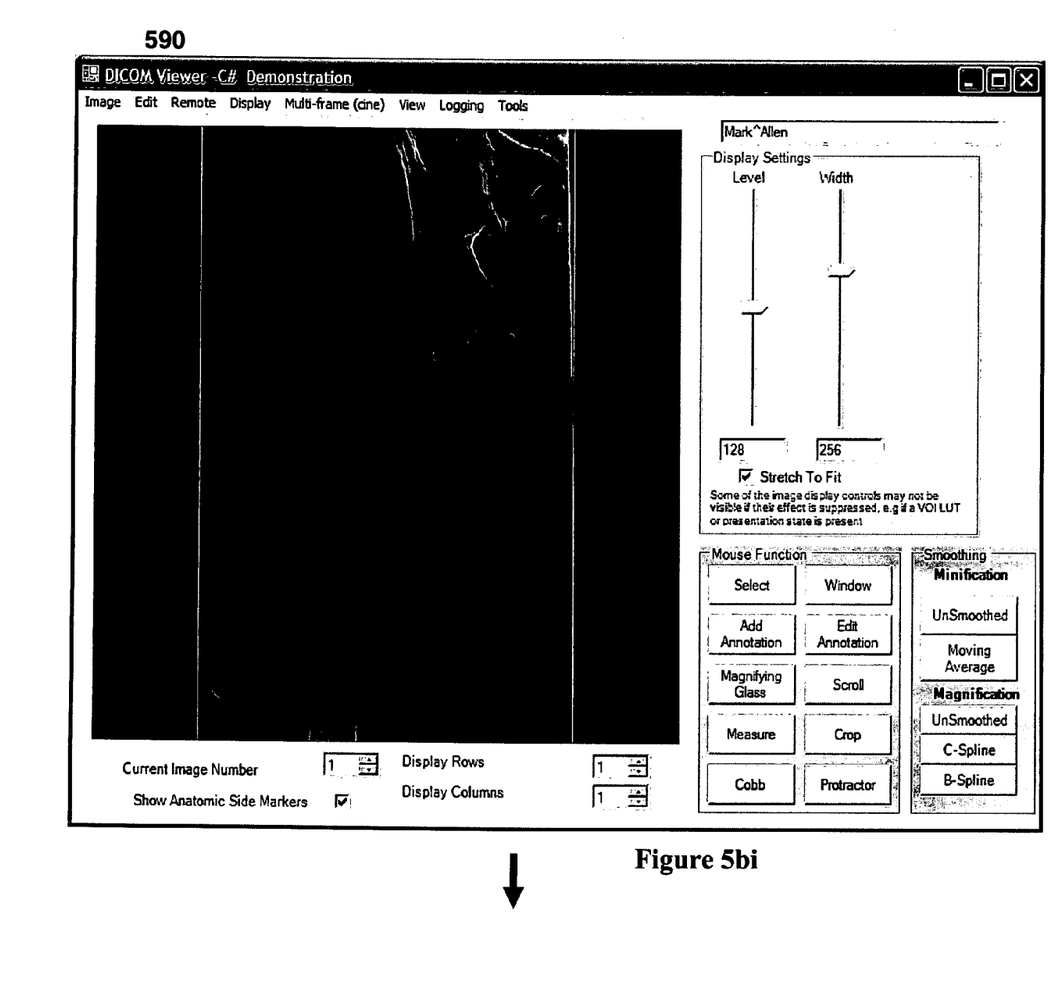
FIG. 5a is a flowchart illustrating a second method for copying image data between computer applications, according to a preferred embodiment of the present invention.
FIG. 5b shows an exemplary image of an object in one application, imported to a target application, according to a preferred embodiment of the present invention.
Figure 5A:
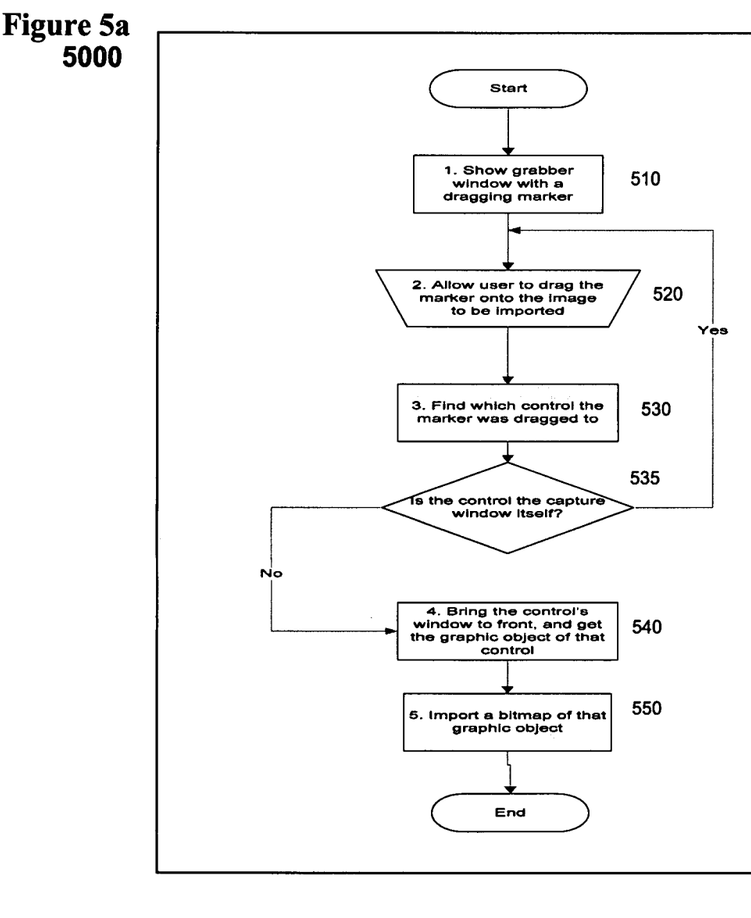

Reference is now made to FIG. 5*a*, which is a flowchart illustrating a second method for copying image data between computer applications, according to a preferred embodiment of the present invention.

Method 5000 may be implemented in the Windows™ operating system environment. In the method the user is presented 510 a grabber window 300 with a marker 310, as illustrated in FIG. 3.

The grabber window 300 presents the user with instructions for selecting the object, and with a marker 310, usable for selecting the object, by dragging the marker onto the object, as described in further detail hereinabove.

The user is allowed 520 to drag the marker 310 onto an image of an object 320 that the user wishes to import into a predefined target application, as described in further detail hereinabove.

Next, there is found 530, the handle of the window of the object selected by the user, say by the image data imported 120. The handle is a unique number assigned by the Windows™ Operating system to each window.

Next, there is verified 535 that the handle does not belong to a window of the target application.

If the handle belongs to the window of the target application, the selection is disabled, and no image data of the object, which appears to be mistakenly selected by the user, is imported to the target application.

If the handle does not belong to a window of the target application, the object is made 530 topmost (say, by making the window of the selected object topmost, as described in further detail hereinbelow), and the image data of the selected object is fetched 540 from the Operating System, say as a bitmap file, as known in the art.

Finally, the image data (say, the bitmap file) is imported 550 to a target application.

The target application may be an application, such as a word processor or a spreadsheet editor, selected in advance by the user or administrator of the apparatus 1000, a target application implementing the method 5000, etc, as described in further detail hereinabove.

Figure 5B:
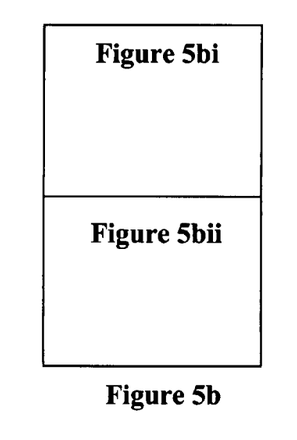

Reference is now made to FIG. 5*b*, which shows an exemplary image of an object in one application, imported to a target application, according to a preferred embodiment of the present invention.

The target application 580 may process the image data of an object presented in an application 590, present an image of the object to the user in minimized or maximized form, using the image data of the object, etc, as described in further detail hereinabove.

Figure 6:
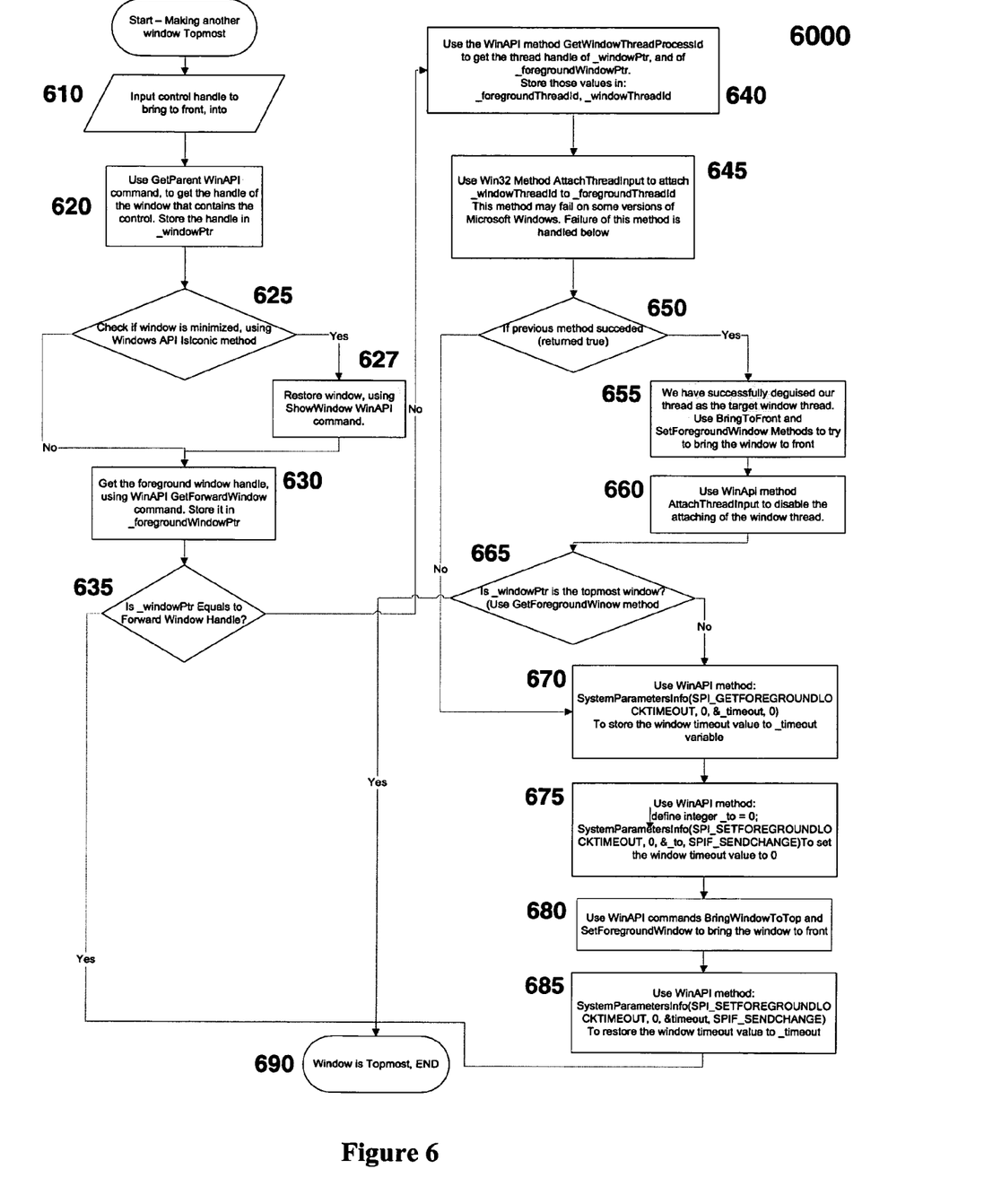
FIG. 6 is a flowchart illustrating a method for making an object topmost, according to a preferred embodiment of the present invention.

Reference is now made to FIG. 6, which is a flowchart illustrating a method for making an object topmost, according to a preferred embodiment of the present invention.

As explained hereinabove, one problem with the Windows™ operating system is that Windows™ operating system does not allow capturing of image data of a window which is not topmost of the windows presented to the user from the operating system, as explained in further detail hereinbelow.

Optionally, the user manually switches to the window of the object the user wishes to select, say using the Windows™ Alt+Tab functionality, as known in the art, thus making the window of the object selected by the user topmost Preferably, the object selected by the user in a Windows™ operating system application is made topmost, say using method 6000.

In method 6000, the handle of an object's window, which needs to be made topmost, is received 610, say by the topmost maker described in further detail hereinabove.

Next, there is used 620 the GetParent Windows™ Application Programming Interface (API) Function, to retrieve the handle of a window which contains the object selected by the user, and the handle is stored 620.

Next, there is checked 625 if the window, which contains the object selected by the user, is minimized. If the window which contains the object selected by the user is minimized, the window is restored to normal size, using the ShowWindow API command, as known in the art.

Next, the handle of the foreground window is retrieved 630 from the operating system, using the GetForwardWindow API command, as known in the art.

If the handle of the foreground window is different than the handle of the window hosting the object 635, then there are performed the following steps:

The API GetWindowThreadProcessID is used to get 640 the handle of the window, which contains the object selected by the user.

The API method GetWindowThreadProcessID is also used to get the handle of the foreground window, and the two handles are stored.

Next, the Win32 AttachThreadInput method is used 645, in order to attach the thread of the window of the object to the thread of the foreground window, using the stored handles. By attaching the threads, the thread of the window of the objects is successfully disguised as the thread of the foreground window (which is usually the window of the target application). Consequently, the BringToFront and SetForegroundWindow, which are usually restricted to the foreground window may be used with respect to the window of the selected object.

If the Win32 AttachThreadInput method succeeds 650 in attaching the threads, the BringToFront and SetForegroundWindow methods are used 655, in order to bring the window of the object to the front. Subsequently, the AttachThreadInput is used again 660 to disable the attachment of the window threads.

However, the AttachThreadInput method may fail.

For example, the Windows™ Operating System may block the AttachThreadInput method for a timeout period of a number of milliseconds from the last when a user uses the mouse or keyboard.

In order to overcome the blocking of the AttachThreadInput method, If the Win32 AttachThreadInput method fails 650, or the Win32 GetForegroundWindow indicates 665 that the window of the object is not topmost, there are carried out the following steps:

- The API SystemParameterInfo method is used 670 with the parameters—SPI_Getforegroundloctimeout, 0, &_timeout, and 0, to store the original window timeout value to the &_timeout variable, where the time out value is the number of seconds in the timeout period from last when the user uses the mouse or keyboard.
- The window timeout is set 675 to zero, using the API SystemParameterInfo.
- The window is brought to the front 680, using the API BringWindowToTop and SetForegroundWindow commands.
- and the window timeout is set 685 to the original window timeout, using the API SystemParameterInfo command.

It is expected that during the life of this patent many relevant devices and systems will be developed and the scope of the terms herein, particularly of the terms "PACS", "Window", "Object", "Image Data", "Thread" and "Handle" is intended to include all such new technologies a priori.

It is appreciated that certain features of the invention, which are, for clarity, described in the context of separate embodiments, may also be provided in combination in a single embodiment.

Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. Apparatus for copying image data between computer applications running under one operating system, the operating system allowing only one application at a time to be a foreground application for which operating system functions are set, by setting of a first, topmost, window, all other applications and windows being set into a background in one or more separate windows, the apparatus comprising a hardware processor configured with computer instructions to provide:
   a) a selector, operable by a user, for selecting an object from a first, source, computer application; and
   b) an image data importer, associated with said selector, and configured to automatically import image data of said selected object into a predetermined target computer application, said predetermined target application being said foreground application and being in said first, topmost window, said importing being as a direct reaction to said selecting, such that said selecting directly causes said importing, said selector comprising a topmost object unit to attach an operating system thread of a window of said source application to an operating system thread of a window of said target application, thereby to make said window of said source application, being one of said one or more separate windows, appear to said operating system as said topmost window, said attached threads disguising said source application to said operating system, to enable operating system functions for said first, source, application and for said second, target, application at the same time, said image data being a medical image of a picture archiving and communication system (PACS) and said target application being configured to calibrate said medical image, wherein said image data importer is further configured to detect whether said selected object belongs to the target application, and, based on said detection, to prevent accidental importation of said image data by a user when said object belongs to the target application.

2. The apparatus of claim 1, further comprising an image capturer, associated with said selector, and configured to capture said image data from the operating system prior to said importing.

3. The apparatus of claim 1, wherein said topmost object unit is configured to disguise said source application window as said topmost window, using a handle of said source application window.

4. The apparatus of claim 1, further comprising an image presenter, associated with said image data importer, and configured to present an image of said selected object in a window of the target application, using said imported image data.

5. The apparatus of claim 1, further comprising an image presenter, associated with said image data importer, and configured to present an image of said selected object in a window of the target application, using said imported image data, according to a predefined policy.

6. The apparatus of claim 1, further comprising an image data processor, associated with said image data importer, and configured to process said image data, according to a predefined policy.

7. The apparatus of claim 1, wherein said selector is further configured to present a marker to said user, and allow said user to drag said marker onto an image of said object, thereby to select said object.

8. Method for copying image data between computer applications running under at least one operating system, the operating system running on a hardware processor, the operating system allowing only one application to be a foreground application running in a topmost window at any given time, all other applications being background applications running in other, separate windows, the method comprising:

through said operating system allowing a user to select an object from a first, source, computer application; and upon said selecting, automatically importing image data of said selected object into a predetermined target computer application through said operating system, said predetermined target computer application being said foreground application and running in said topmost window, said importing being a direct reaction to said selecting, such that said selecting directly causes said importing, the method comprising attaching an operating system thread of a window of said first, source application to an operating system thread of a window of said target application, said source application running in one of said separate windows, thereby disguising said window of said first, source, application to said operating system as said topmost window, to allow operating system functionality for said source and target applications together in two separate and distinct windows respectively, said image data being a medical image of a picture archiving and communication system (PACS) and said target application calibrating said medical image, and further detecting whether said selected object belongs to the target application, and, based on said detecting, preventing accidental importation of said image data by a user when said object belongs to the target application.

9. The method of claim 8, further comprising capturing said image data from the operating system prior to said importing.

10. The method of claim 8, further comprising capturing said image data of said selected object made topmost from the operating system.

11. The method of claim 8, further comprising presenting an image of said selected object in a window of the target application, using said imported image data.

12. The method of claim 8, further comprising presenting an image of said selected object in a window of said target application, using said imported image data, according to a predefined rule.

13. The method of claim 8, further comprising processing said image data, according to a predefined rule.

14. The method of claim 8, further comprising presenting a marker to said user, and allowing said user to drag said marker onto an image of said object, thereby to select said object.

15. Apparatus for copying image data between computer applications running under one operating system, the operating system allowing only one application at a time to be a foreground application by setting of a topmost window, all other applications and windows being set into a background in separate windows, predetermined operating system functions being reserved only for said foreground application, the apparatus comprising a hardware processor configured with computer instructions to provide:
 a) a selector, operable by a user, for selecting an object from a first computer application, said selector including functionality for comparing a window containing said object with a currently topmost window and attaching an operating system thread of said window containing said object with an operating system thread of said currently topmost window, said attaching of threads disguising said window containing said object to the operating system, such that said operating system functions reserved for said topmost window are rendered available to both said currently topmost window and said window containing said object, said currently topmost window and said window containing said object being separate and distinct windows respectively; and
 b) an image data importer, associated with said selector, and configured such that said selecting by said selector on said source application window directly invokes said predetermined target application, to automatically import image data of said selected object into said predetermined target computer application, such that said selecting is causative of said importing, said image data importer further configured to detect whether said selected object belongs to the target application, and, based on said detection, to prevent accidental importation of said image data by a user when said object belongs to the target application; and
 said image data being a medical image of a picture archiving and communication system (PACS) and said target application being configured to calibrate said medical image.

* * * * *